(12) United States Patent
Jung et al.

(10) Patent No.: US 6,330,527 B1
(45) Date of Patent: Dec. 11, 2001

(54) APPARATUS AND METHOD FOR MODELING FRAMEWORKS VIA USE OF OBJECT-ORIENTED ANALYSIS INFORMATION

(75) Inventors: Hyo Taeg Jung; Dong Kwan Kim, both of Taejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 09/203,571

(22) Filed: Dec. 2, 1998

(30) Foreign Application Priority Data

Aug. 11, 1998 (KR) .................................................. 98/32528

(51) Int. Cl.⁷ ..................................................... G06F 17/27
(52) U.S. Cl. .................................. 703/22; 703/2; 717/1; 717/2; 345/751; 707/103
(58) Field of Search .................................. 703/24, 25, 27, 703/22, 2; 717/1, 2; 345/751; 707/103, 102; 709/203

(56) References Cited

U.S. PATENT DOCUMENTS

| | | |
|---|---|---|
| 5,019,961 | 5/1991 | Addesso et al. . |
| 5,325,533 | 6/1994 | McInerney et al. . |
| 5,758,160 | 5/1998 | McInerney et al. . |
| 5,936,860 * | 8/1999 | Arnold et al. ................... 364/468.01 |
| 5,937,189 * | 8/1999 | Branson et al. ...................... 395/701 |
| 5,991,877 * | 11/1999 | Luckenbaugh ....................... 713/200 |
| 6,052,711 * | 4/2000 | Gish ..................................... 709/203 |
| 6,067,548 * | 5/2000 | Cheng .................................. 707/103 |
| 6,081,798 * | 7/2000 | Johnson et al. ....................... 706/54 |
| 6,085,196 * | 7/2000 | Motoyama et al. ................. 707/102 |

OTHER PUBLICATIONS

Designing a Framework by Stepwise Generalization; Kai Koskimies and Hanspeter Mossenbock.
Documenting Frameworks Using Patterns; Ralph E. Johnson; 1992.
An Experiment in Framework Development; Eduardo Casais; pp. 95–125.

* cited by examiner

Primary Examiner—Kevin J. Teska
Assistant Examiner—Thai Phan
(74) Attorney, Agent, or Firm—Antonelli, Terry, Stout & Kraus, LLP (57) ABSTRACT

An inventive apparatus and method are to structurally and movably model frameworks by discriminating classes, control flows and interfaces within the framework, from analysis information generated through a use of a unified modeling language. The inventive method includes a first step of describing, by using the UML, a use case diagram, a flow of events, a sequence diagram and a class diagram; a second step of discriminating frameworks from the use case diagram; a third step of discriminating objects and messages of the sequence diagram and identifying a relation among classes within the class diagram, and thereby structurally modeling the framework; and a fourth step of distinguishing objects, message flows and messages of the sequence diagram, and identifying classes, control flows and interfaces within the framework, and thereby movably modeling the framework. Such embodied framework can be utilized as a substructure in developing software of a computing system.

20 Claims, 6 Drawing Sheets

APPARATUS AND METHOD FOR MODELING FRAMEWORKS VIA USE OF OBJECT-ORIENTED ANALYSIS INFORMATION

FIELD OF THE INVENTION

The present invention relates to an apparatus and method for modeling frameworks; and, more particularly, to an apparatus and method for structurally and movably modeling frameworks, to thereby get a lot of information necessary for embodying the frameworks from object-oriented analysis information using a unified modeling language (UML).

DESCRIPTION OF THE PRIOR ART

At the present there is a growing tendency in an importance for a reuse of a software with active researches for frameworks and are being actually manufactured commercial products appropriate for a specific domain.

In general, however, it is the actual condition that the research for the framework can be only said a start, especially researches, not only for modeling the frameworks based on the UML, but also for a framework developing methodology, do not exist at all.

These researches are essential to develop the frameworks and extend a reusing efficiency of the software by utilizing the existed object-oriented analysis information on the condition of an activated research in related respective fields.

SUMMARY OF THE INVENTION

It is, therefore, a primary object of the invention to provide an apparatus and method for modeling frameworks by executing class, control flow and interface analyses within the framework, in which various information necessary for a framework embodiment can be simply obtained from analysis information generated through a use of a UML.

In accordance with the present invention for achieving the above object, an apparatus for modeling frameworks includes an analysis information writing block for describing, by using the UML, a use case diagram, a use case events flow, a sequence diagram and a class diagram; an identification block for discriminating frameworks by using the use case diagram; a structural modeling block for discriminating objects and messages of the sequence diagram via a use of results from the analysis information writing block and the identification block, and structurally modeling the frameworks by discriminating a relation among classes within the class diagram; and a movable modeling block for identifying objects, message flows and messages of the sequence diagram by using results of the analysis information writing block and the identification block, and movably modeling the frameworks by discriminating classes, control flows and interfaces within the framework.

The inventive apparatus further includes an analysis information processing block for processing analysis information modelled by the structural modeling block and the movable modeling block, for the sake of embodying such frameworks.

In accordance with the present invention for attaining the above object, a method for modeling frameworks, for use of a computing system, includes a first step of describing, by using the UML, a use case diagram, a flow of events, a sequence diagram and a class diagram; a second step of discriminating frameworks from the use case diagram; a third step of discriminating objects and messages of the sequence diagram and identifying a relation among classes within the class diagram, and then structurally modeling the framework; and a fourth step of discriminating objects, message flows and messages of the sequence diagram, and identifying classes, control flows and interfaces within the framework, and then movably modeling the framework.

The inventive method further includes a fifth step of processing analysis information modelled structurally and movably as above-mentioned, for the sake of embodying such frameworks.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION PREFERRED EMBODIMENTS

The preferred embodiments of the present invention are described in detail as follows, referring to the accompanying drawings.

Schematically describing a method for structurally and movably modeling a framework, a structural modeling process is to identify classes constituting a framework by utilizing a correlation among a use case event flow, a sequence diagram and a class diagram, which are as analysis information using the UML, and are also related to a course for discriminating a relation among the classes. That is, events in the flow of events are mapped as messages of the sequence diagram, and the messages of the sequence diagram are mapped as methods of classes within the class diagram. Such relation among them can be applied to embodying the framework.

Meanwhile, the movable modeling process is to discriminate a control flow and an interface within the framework by using a use case event flow and a sequence diagram. That is to say, control flow information within a use case event flow can be represented as a message flow of the sequence diagram, and the message flow of the sequence diagram is mapped as a control flow of the framework. Such a fact may be used in definitely grasping a flow of messages among objects.

Information gotten through such modeling processes can be utilized as analysis information necessary for embodying the framework and such embodied framework can be utilized as a substructure in developing software, to thereby furnish many advantages in the aspects of a software reuse and its maintenance-repair.

Figure 1:
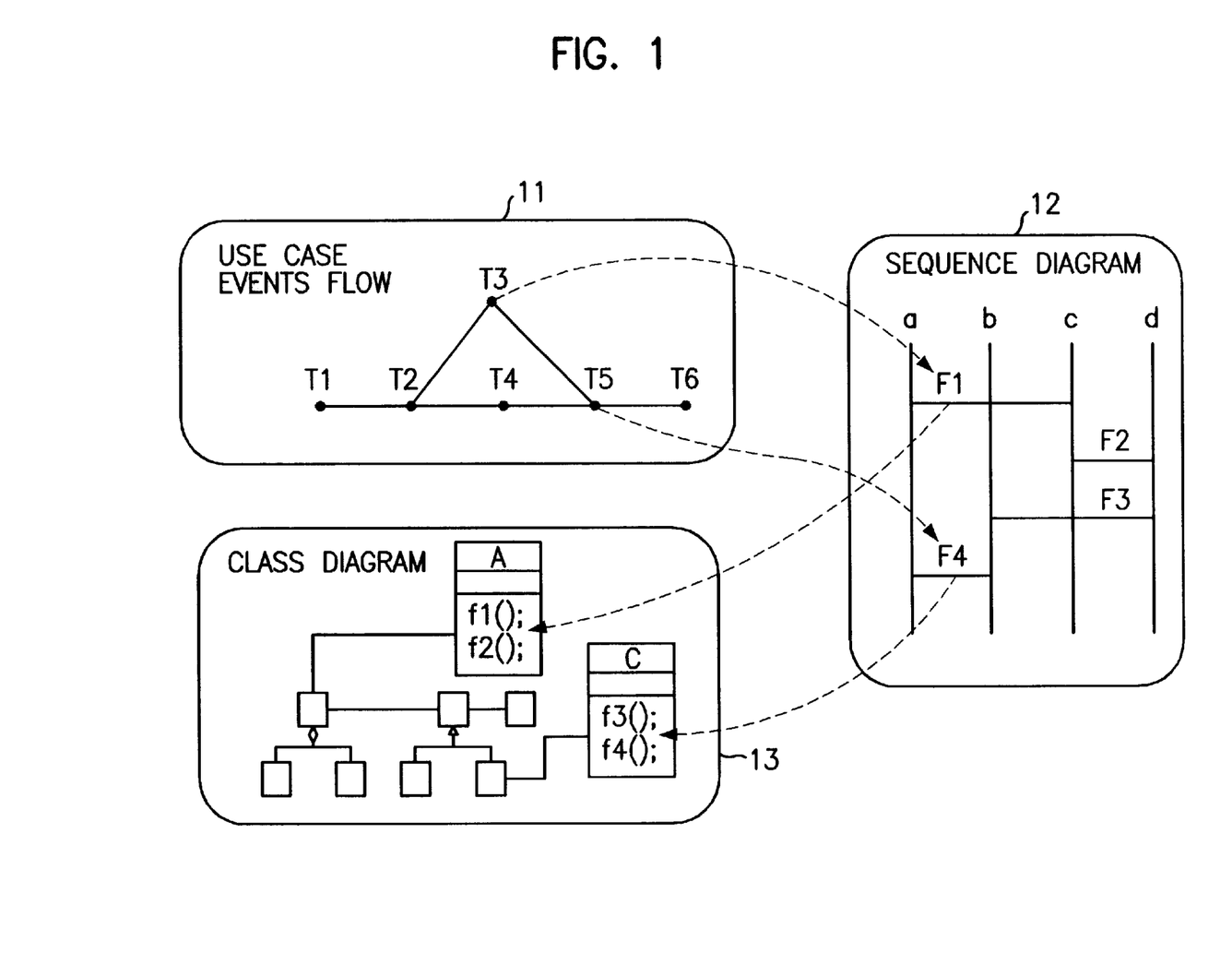
FIG. 1 depicts an explanatory diagram showing a relation among diagrams for a structural modeling of a framework in accordance with the present invention.

FIG. 1 provides an explanatory diagram showing a relation among diagrams in a structural modeling process applied to an inventive framework, in which it represents a correlation among a use case event flow 11, a sequence diagram 12 and a class diagram 13 which are as analysis information using the UML.

In a structural modeling process of a framework, respective events within a use case event flow 11 are represented as messages of the sequence diagram 12, and the messages within the sequence diagram 12 are mapped as methods of classes within the class diagram 13.

In FIG. 1, there are six events T1 to T6 in a use case event flow 11, in which third and fifth events T3 and T5 are respectively mapped to first and fourth messages F1 and F4 of the sequence diagram 12. The first and fourth messages F1 and F4 of the sequence diagram 12 are each mapped to a method [f1( )] of a class A and a method [f4( )] of a class C in the class diagram 13.

Figure 2:
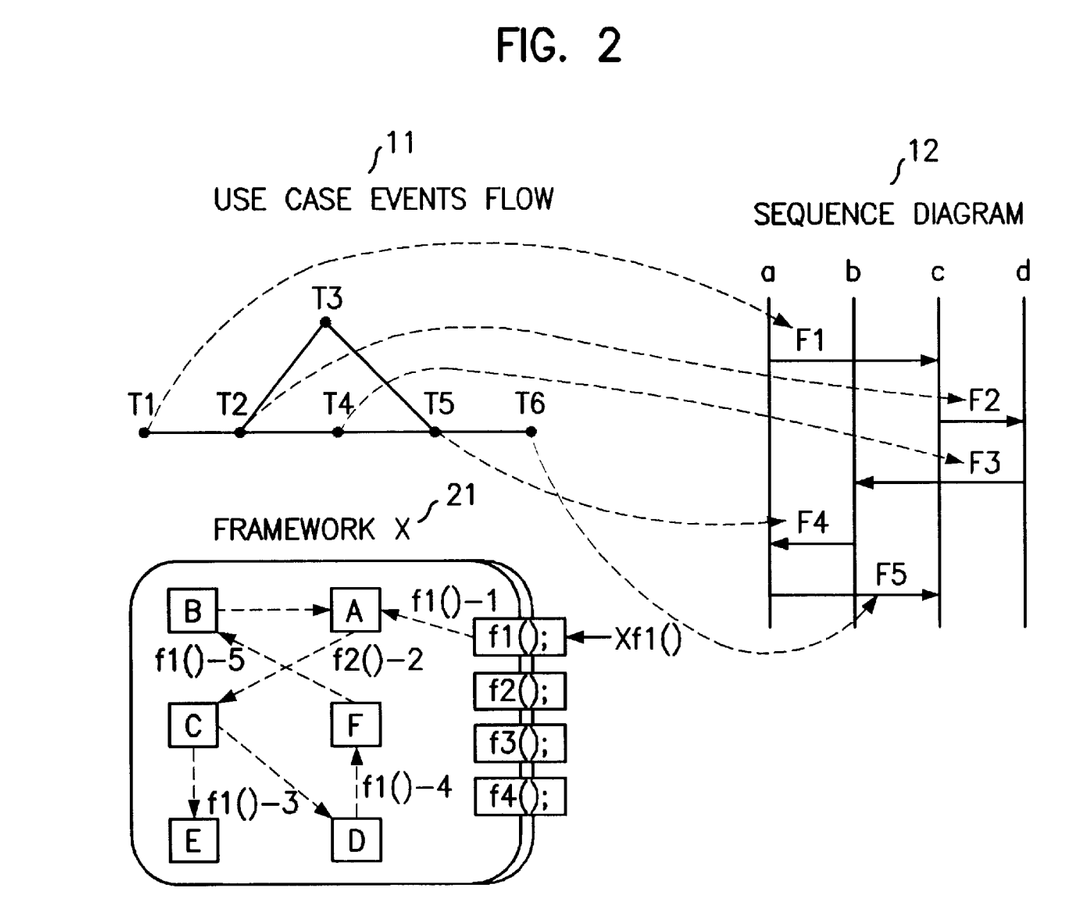
FIG. 2 represents an explanatory diagram providing a relation among diagrams for a movable modeling of a framework in the invention.

FIG. 2 sets forth an explanatory diagram providing a relation among diagrams in a movable modeling process applied to an inventive framework, in which it represents a constructive correlation among the use case events flow 11, the sequence diagram 12, a control flow and interface of a framework X 21, which are as analysis information using the UML.

In a movable modeling process of a framework, control information of the use case event flow 11 is represented as a flow of messages in the sequence diagram 12, and the flow of messages within the sequence diagram 12 is mapped as the control flow of the framework X 21.

In FIG. 2, there are six events T1 to T6 in the use case events flow 11, in which first, second, fourth, fifth and sixth events T1, T2, T4, T5 and T6 are respectively mapped to first to fifth messages F1 to F5 in the sequence diagram 12.

Objects a,b,c,d related to such message flow are mapped to classes within the framework X 21, and at this time, a message flow among the respective classes is a control flow within the framework X 21. In other words, the message flow of the sequence diagram 12 as F1→F2→F3→F4→F5 is as the control flow of the framework X 21 as f1( )_1→ f1( )_2→f1( )_3→f1( )_4→f1( )_5.

Figure 3:
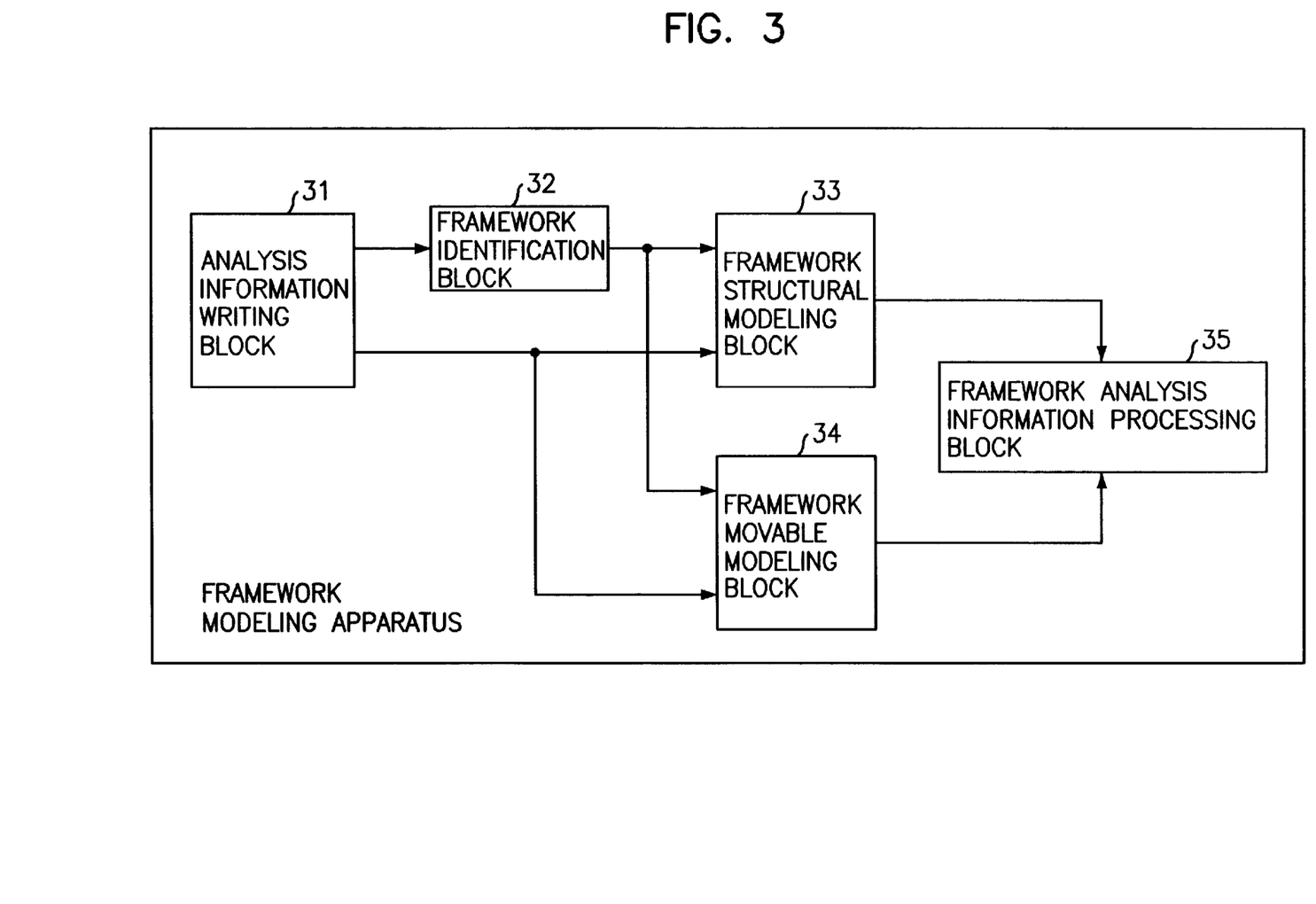
FIG. 3 provides a block diagram of one preferred embodiment in an inventive framework modeling apparatus.

FIG. 3 depicts a block diagram of one preferred embodiment for a framework modeling apparatus in the invention.

The inventive framework modeling apparatus includes an analysis information writing block 31 for describing, by using the UML, a use case diagram, a use case events flow, a sequence diagram and a class diagram; a framework identifying block 32 for discriminating frameworks from the use case diagram; a framework structural modeling block 33 for discriminating objects and messages of the sequence diagram via a use of results from the analysis information writing block 31 and the framework identifying block 32, and identifying mutual classes and a relation among classes within the class diagram; and a framework movable modeling block 34 for identifying messages, a message flow and objects of the sequence diagram by using results of the analysis information writing block 31 and the framework identifying block 32, and discriminating classes, a control flow and an interface within the framework. The framework modeling apparatus further includes a framework analysis information processing block 35 for processing analysis information modelled by the framework structural modeling block 33 and the framework movable modeling block 34, for the sake of embodying the framework.

The analysis information writing block 31 writes out, by using the UML, a use case diagram, a use case events flow explaining the use case diagram, a sequence diagram which represents an exchange of messages between objects and a class diagram which provides classes and a relation among the classes.

The framework identifying block 32 distinguishes the frameworks from the use case diagram written out in the analysis information writing block 31.

The framework structural modeling block 33 executes a structural modeling of the framework by using results of the analysis information writing block 31 and the framework identifying block 32.

Functions of the framework structural modeling block 33 are described in detail as follows.

In a first function, messages of the sequence diagram mapped with events provided within the use case event flow are distinguished from one another. Herewith, a message belonging to a specific use case can be extracted therefrom, since each of the events within the use case events flow is mapped to each message of the sequence diagram.

As a second function, objects receiving the distinguished messages are discriminated in the sequence diagram. These objects have methods corresponding to messages, thus are used for a class extraction.

Third, methods and classes complying with messages and objects are identified from the class diagram, and such identified classes become classes constituting the framework.

In a fourth function, it is discriminated a relation among classes constituting the framework, and herewith such process can be applied to all frameworks.

The framework movable modeling block 34 executes a movable modeling of the framework by using results of the analysis information writing block 31 and the framework identifying block 32.

Functions of the framework movable modeling block 34 are provided in detail as follows.

First, messages of the sequence diagram mapped with events provided within the use case events flow, and a flow of messages, are distinguished.

Second, objects related with the distinguished message flow are discriminated.

In a third function, classes of the framework mapped with the discriminated objects are identified. In such identifying process, the classes of the framework extracted in the framework structural modeling process can be utilized.

As a fourth function, message flows among the distinguished classes within the framework are identified and the identified message flows become control flows of the framework.

Fifth, methods as start points of control flows are discriminated and such discriminated methods become interfaces of the framework.

The framework analysis information processing block 35 uses results from the structural and movable modeling processes executed in the framework structural modeling block 33 and the framework movable modeling block 34, as analysis information necessary for embodying the framework.

Figure 4:
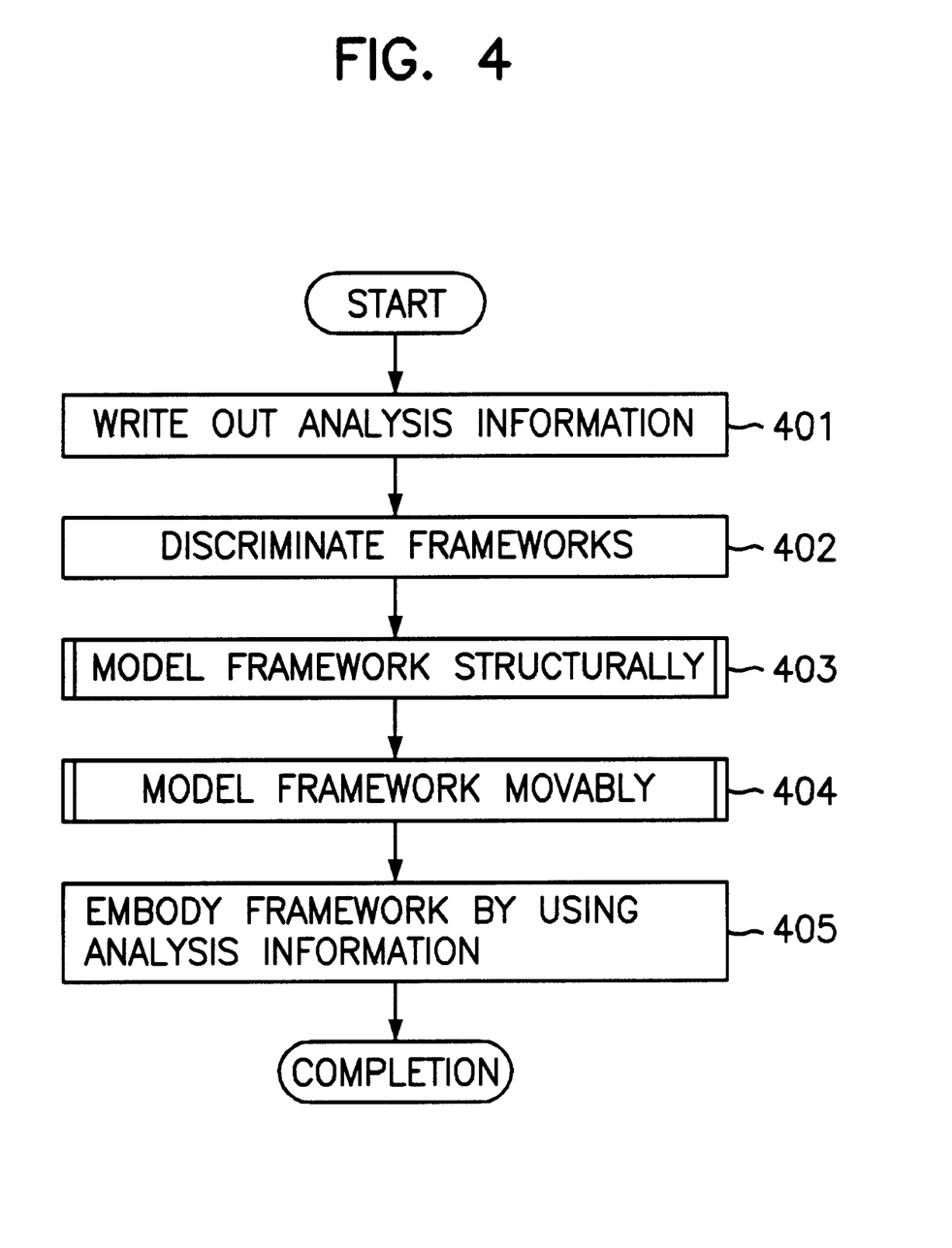
FIG. 4 sets forth an overall flow chart of one preferred embodiment in an inventive framework modeling method.

FIG. 4 represents an overall flow chart of one preferred embodiment for a framework modeling method in the present invention.

In a step 401, first, the analysis information writing block 31 writes out, by using the UML, a use case diagram, a use case events flow explaining the use case diagram, a sequence diagram which represents an exchange of messages between objects and a class diagram which provides classes and a relation among the classes.

In a step 402, next, the framework identifying block 32 distinguishes the frameworks from the use case diagram written out in the analysis information writing block 31.

In a step 403, then, the framework structural modeling block 33 executes a structural modeling of the framework by using results of the analysis information writing block 31 and the framework identifying block 32.

Figure 5A:
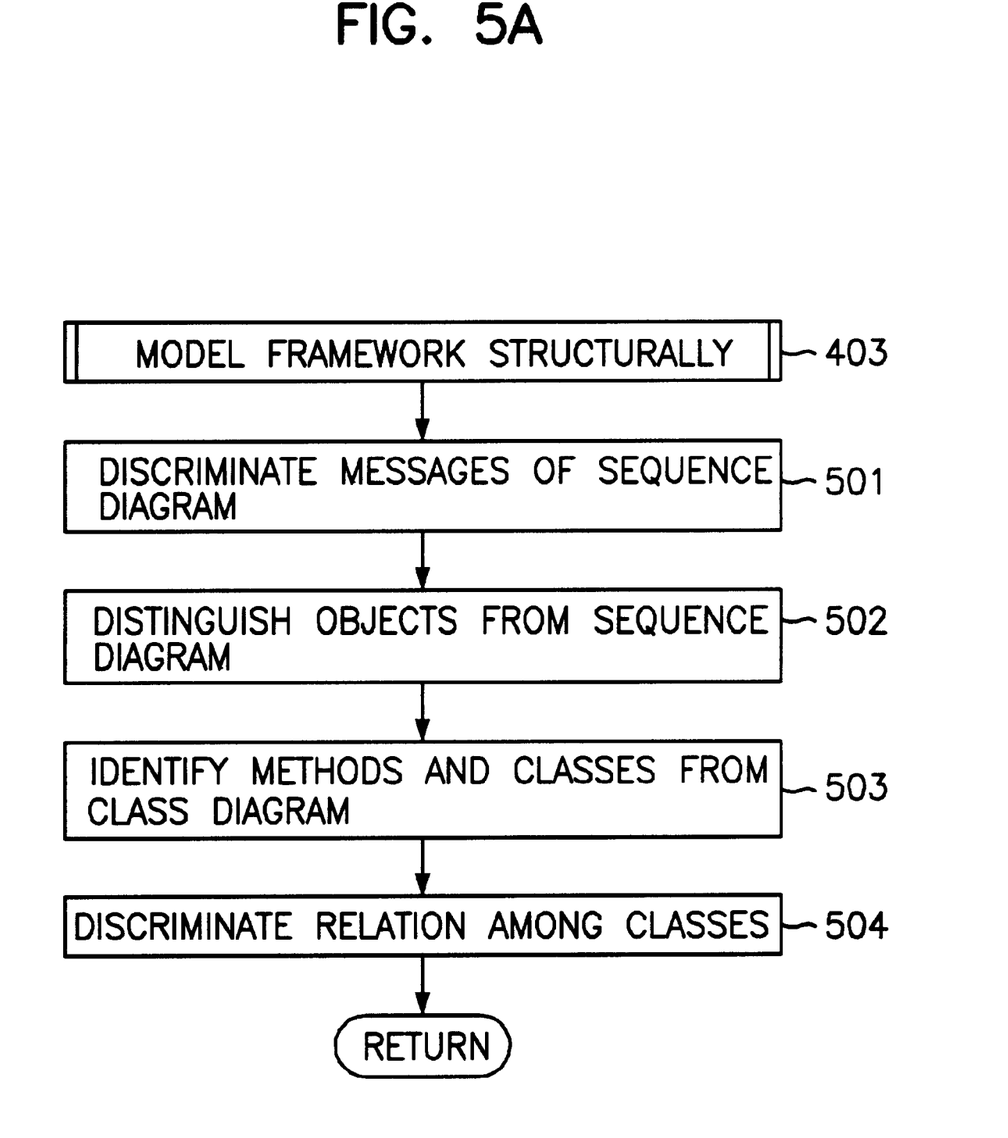
FIG. 5a illustrates a detailed flow chart representing one embodiment for the framework structural modeling process in the invention.

Referring to FIG. 5a, the framework structural modeling process of the step 403 is described as follows.

In a step 501, first, messages of the sequence diagram mapped with events provided within the use case event flow are distinguished from one another. Herewith, a message belonging to a specific use case can be extracted therefrom, since each of the events within the use case event flow is mapped to each message of the sequence diagram.

In a step 502, next, objects receiving the distinguished messages are discriminated in the sequence diagram. These objects have methods corresponding to messages, thus are used for a class extraction.

Thereafter, methods and classes complying with messages and objects are identified from the class diagram in a step 503, and such identified classes become classes constituting the framework.

Then, it is discriminated a relation among classes constituting the framework in a step 504.

Such framework structural modeling process of the step 403 as above-mentioned can be applied to all frameworks.

Meantime, the framework movable modeling block 34 executes a movable modeling of the framework by using results of the analysis information writing block 31 and the framework identifying block 32, in a step 404.

Figure 5B:
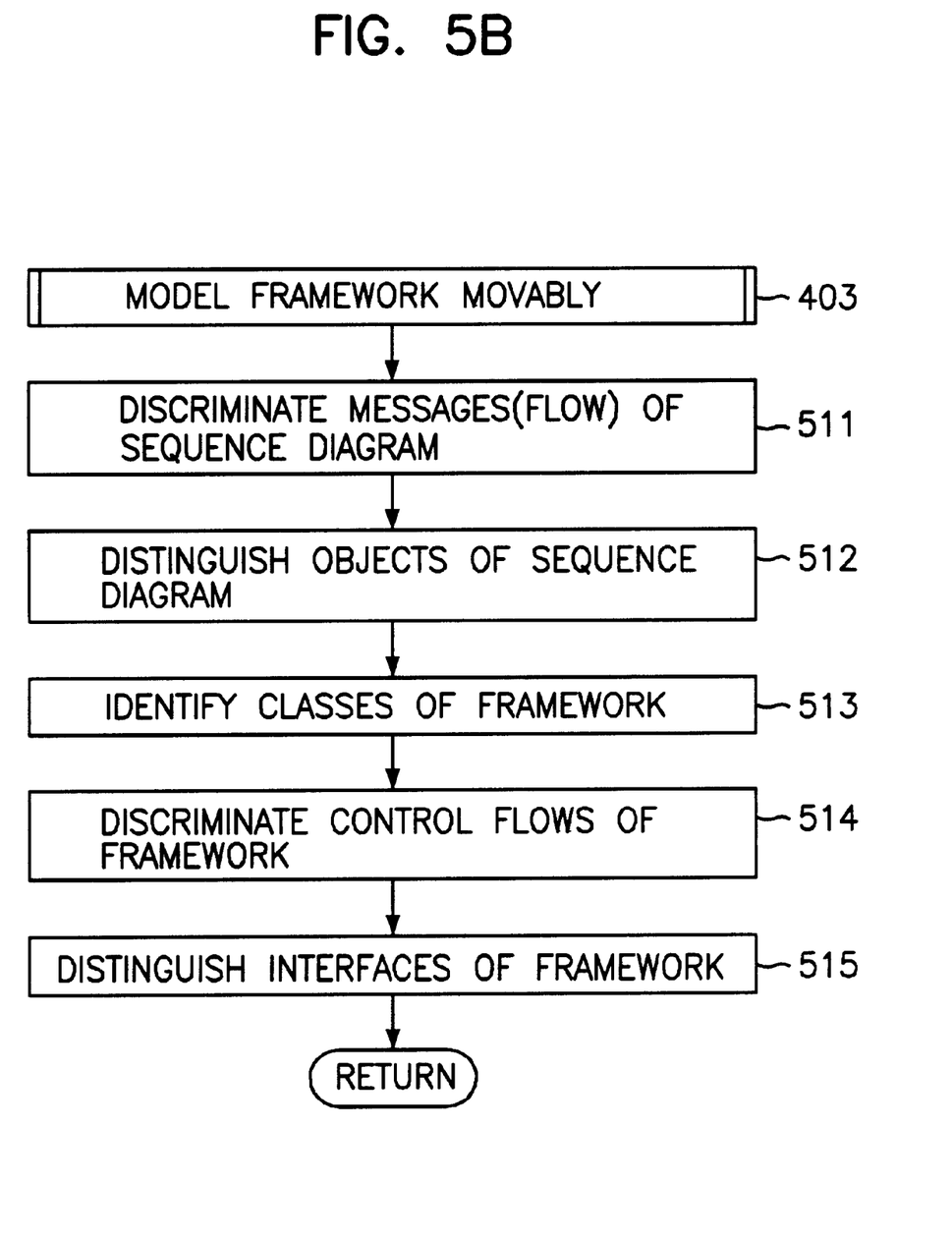
FIG. 5b offers a detailed flow chart of one preferred embodiment for the framework movable modeling process in the present invention.

With reference to FIG. 5b, the framework movable modeling process of the step 404 is provided in detail as follows.

First, messages of the sequence diagram mapped with events provided within the use case events flow, and a flow of messages, are distinguished in a step 511, and objects related with the distinguished message flow are discriminated in a step 512.

Next, classes of the framework mapped with the discriminated objects are identified in a step 513. In such identifying process, the classes of the framework extracted in the structural modeling process can be utilized.

Thereafter, message flows among the distinguished classes within the framework are identified in a step 514 and the identified message flows become control flows of the framework.

Then, methods as start points of control flows are discriminated in a step 515 and such discriminated methods become interfaces of the framework.

Finally, results from the structural and movable modeling processes are utilized as analysis information necessary for embodying the framework in the framework analysis information processing block 35.

In accordance with the present invention, as aforementioned, the framework is modelled structurally and movably by using the analysis information using the UML, to thereby easily obtain information necessary for an embodiment of the framework.

That is, in the above-mentioned invention it is provided analysis information necessary for embodying frameworks by modeling the framework structurally and movably through the analysis information generated via a use of the UML, further many advantages in the aspects of a software reuse and its maintenance-repair are provided when the framework embodied by such analysis information is utilized as a substructure in developing software.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for modeling frameworks comprising:
   analysis information writing means for writing, by using a unified modeling language (UML), a use case diagram, a use case events flow, a sequence diagram and a class diagram;
   identification means for discriminating frameworks from the use case diagram;
   structural modeling means for discriminating messages and objects of the sequence diagram via a use of results from said analysis information writing means and said identification means, distinguishing classes and a relation among the classes within the class diagram, and structurally modeling the framework; and
   movable modeling means for identifying messages, message flows and objects of the sequence diagram by using results of said analysis information writing means and said identification means, discriminating classes, control flows and interfaces within the framework, and movably modeling the framework.

2. The apparatus of claim 1, further comprising analysis information processing means for processing analysis information modeled by said structural modeling means and said movable modeling means, for embodying said framework.

3. The apparatus of claim 1, wherein said structural modeling means executes that events within the use case event flow are mapped to messages of the sequence diagram and the messages of the sequence diagram are mapped to messages of the class diagram.

4. The apparatus of claim 3, wherein said structural modeling means performs such structural modeling processes as the messages of said sequence diagram mapped with the events provided within the use case event flow are distinguished, objects receiving said distinguished messages are discriminated from the sequence diagram, methods and classes complying with the messages and the objects are identified from said class diagram, and a relation among the classes constituting said framework is distinguished.

5. The apparatus of claim 3, wherein said movable modeling means performs that control flow information within the use case events flow is mapped to a flow of messages in said sequence diagram and the flow of messages in the sequence diagram is mapped to a control flow of said framework.

6. The apparatus of claim 5, wherein said movable modeling means executes such movable modeling process as messages and message flows of said sequence diagram mapped with events provided within the use case event flow are discriminated, objects related with the discriminated message flow are distinguished, classes of the framework mapped with the discriminated objects are identified, message flows among the identified classes within the framework are discriminated, and methods as start points of the control flows are distinguished.

7. A method for modeling frameworks, for use of a computing system, comprising:
   a) writing a use case diagram, a flow of events, a sequence diagram and a class diagram by using a unified modeling language;
   b) discriminating the frameworks from the use case diagram;
   c) distinguishing objects and messages of the sequence diagram, identifying classes and a relation among the classes within the class diagram, and structurally modeling the framework; and
   d) discriminating messages, message flows and objects of the sequence diagram, identifying classes, control flows and interfaces within the framework, and movably modeling the framework.

8. The method of claim 7, further comprising the step of processing analysis information modelled structurally and movably so as to embody said framework.

9. The method of claim 7, wherein said step c) performs that events within the use case events flow are mapped to messages of the sequence diagram and the messages of the sequence diagram are mapped to messages of the class diagram.

10. The method of claim 9, wherein said step c) comprises:
   c1) discriminating the messages of said sequence diagram mapped with the events provided within the use case event flow;
   c2) distinguishing objects receiving said discriminated messages from the sequence diagram;
   c3) identifying methods and classes complying with the messages and the objects from said class diagram; and
   c4) distinguishing a relation among the classes constituting said framework.

11. The method of claim 9, wherein said step d) executes that control flow information within the use case events flow is mapped to a flow of messages in said sequence diagram and the flow of messages in the sequence diagram is mapped to a control flow of said framework.

12. The method of claim 11, wherein said step d) comprises:
   d1) discriminating the messages and the message flows of said sequence diagram mapped with the events provided within the use case events flow;
   d2) distinguishing objects related with the discriminated message flows;
   d3) identifying classes of the framework mapped with the distinguished objects;
   d4) distinguishing message flows among the identified classes within the framework; and
   d5) discriminating methods as start points of control flows.

13. The method of claim 12, wherein the distinguished message flows of said step d4) are the control flows of said framework.

14. The method of claim 13, wherein the discriminated methods are the interfaces of said framework.

15. A framework modeling apparatus comprising:
   an analysis information writing unit arranged to describe, using a unified modeling language (UML), a use case diagram, a use case events flow which explains said use case diagram, a sequence diagram which represents an exchange of messages between objects, and a class diagram which provides classes and a relation among the classes;
   a framework identification unit arranged to discriminate frameworks from said use case diagram;
   a framework structural modeling unit arranged to execute a structural modeling of the framework based on results of said analysis information writing unit and said framework identification unit; and
   a framework movable modeling unit arranged to execute a movable modeling of the framework based on results of said analysis information writing unit and said framework identification unit.

16. The framework modeling apparatus of claim 15, further comprising a framework analysis information processor arranged to process analysis information modelled by said framework structural modeling unit and said framework movable modeling unit so as to embody the framework.

17. The framework modeling apparatus of claim 15, wherein said framework structural modeling unit executes that events within the use case event flow are mapped to messages of said sequence diagram and the messages of said sequence diagram are mapped to messages of said class diagram.

18. The framework modeling apparatus of claim 15, wherein said framework structural modeling unit performs such structural modeling as the messages of said sequence diagram mapped with the events provided within the use case event flow are distinguished, objects receiving said distinguished messages are discriminated from said sequence diagram, methods and classes complying with the messages and the objects are identified from said class diagram, and a relation among the classes constituting the framework is distinguished.

19. The framework modeling apparatus of claim 15, wherein said framework movable modeling unit performs that control flow information within the use case events flow is mapped to a flow of messages, in said sequence diagram and the flow of messages in said sequence diagram is mapped to a control flow of the framework.

20. The framework modeling apparatus of claim 15, wherein said framework movable modeling means executes such movable modeling as messages and message flows of said sequence diagram mapped with events provided within the use case event flow are discriminated, objects related with the discriminated message flow are distinguished, classes of the framework mapped with the discriminated objects are identified, message flows among the identified classes within the framework are discriminated, and methods as start points of the control flows are distinguished.

* * * * *